(12) United States Patent
Fischer et al.

(10) Patent No.: US 11,285,567 B2
(45) Date of Patent: Mar. 29, 2022

(54) MACHINING MODULE FOR A DEVICE FOR AN ADDITIVE MANUFACTURING PROCESS

(71) Applicant: Gefertec GmbH, Berlin (DE)

(72) Inventors: Georg Fischer, Berlin (DE); Tobias Röhrich, Turnow-Preilack (DE); Igor Haschke, Berlin (DE)

(73) Assignee: Gefertec GmbH, Berlin (DE)

( * ) Notice: Subject to any disclaimer, the term of this patent is extended or adjusted under 35 U.S.C. 154(b) by 827 days.

(21) Appl. No.: 15/766,835

(22) PCT Filed: Oct. 4, 2016

(86) PCT No.: PCT/DE2016/100461
§ 371 (c)(1),
(2) Date: Apr. 9, 2018

(87) PCT Pub. No.: WO2017/059842
PCT Pub. Date: Apr. 13, 2017

(65) Prior Publication Data
US 2019/0061061 A1    Feb. 28, 2019

(30) Foreign Application Priority Data
Oct. 9, 2015  (DE) .......................... 102015117238.0

(51) Int. Cl.
*B23K 26/70*    (2014.01)
*B23K 26/342*   (2014.01)
(Continued)

(52) U.S. Cl.
CPC .......... *B23K 26/703* (2015.10); *B22F 3/1028* (2013.01); *B22F 10/20* (2021.01);
(Continued)

(58) Field of Classification Search
None
See application file for complete search history.

(56) References Cited

U.S. PATENT DOCUMENTS

| | | | | |
|---|---|---|---|---|
| 2,799,769 A | * | 7/1957 | Vogel | B23K 9/291 219/75 |
| 3,575,568 A | * | 4/1971 | Tateno | B23K 10/02 219/75 |

(Continued)

FOREIGN PATENT DOCUMENTS

KR    20130022845 A    3/2013

*Primary Examiner* — Ibrahime A Abraham
*Assistant Examiner* — Gyounghyun Bae
(74) *Attorney, Agent, or Firm* — Michael Soderman

(57) ABSTRACT

The invention relates to a machining module for a device for producing a molded metal body (1) by means of an additively generative manufacturing process. A sheet, wire, or pulverulent metal-containing starting material (2) is melted and applied in layers, thereby forming the molded body (1). According to the invention, in addition to a material supply device (9), the machining module comprises a protective gas supply device (11), which has an outlet opening arranged annularly about the material supply device (9), and a fluid supply device (3) for supplying coolant (4), having one or more nozzles (10) which are arranged spatially adjacent to the material supply device (9) such that the surface of the molded body (1) can be supplied with the coolant (4) in points or in a partial manner directly adjacent to the melt bath at one position or along a curve, each of which can be specified in a variable manner.

5 Claims, 3 Drawing Sheets

(51) Int. Cl.
  *B23K 9/04*  (2006.01)
  *B33Y 30/00*  (2015.01)
  *B22F 3/10*  (2006.01)
  *B22F 10/20*  (2021.01)
  *B22F 10/30*  (2021.01)

(52) U.S. Cl.
  CPC .............. *B23K 9/04* (2013.01); *B23K 26/342* (2015.10); *B23K 26/702* (2015.10); *B33Y 30/00* (2014.12); *B22F 10/30* (2021.01); *B22F 2999/00* (2013.01); *Y02P 10/25* (2015.11)

(56) References Cited

U.S. PATENT DOCUMENTS

| | | | | |
|---|---|---|---|---|
| 4,645,901 A * | 2/1987 | Scholz | ................ | B23K 9/323 219/125.1 |
| 4,902,871 A * | 2/1990 | Sanders | ................ | H05H 1/38 219/121.49 |
| 5,220,149 A * | 6/1993 | Neidhardt | ............ | B23K 26/123 219/121.67 |
| 5,321,224 A * | 6/1994 | Kamimura | ............... | B23K 9/04 219/76.15 |
| 5,473,132 A * | 12/1995 | Sperling | ................ | B23K 9/285 219/75 |
| 5,486,676 A * | 1/1996 | Aleshin | ................ | B23K 26/144 219/121.63 |
| 5,714,729 A * | 2/1998 | Yamada | ................ | B23K 9/167 219/136 |
| 5,808,270 A * | 9/1998 | Marantz | ................ | B05B 7/224 219/121.47 |
| 6,046,426 A * | 4/2000 | Jeantette | ............ | B01F 13/0255 219/121.63 |
| 6,268,584 B1 * | 7/2001 | Keicher | ................ | B23K 26/144 219/121.64 |
| 6,706,993 B1 * | 3/2004 | Chancey | ................ | B05B 7/224 219/121.47 |
| 10,421,142 B2 * | 9/2019 | Stempfer | ................ | B33Y 50/00 |
| 2003/0024917 A1 * | 2/2003 | Thielmann | ................ | B23K 9/32 219/136 |
| 2004/0222198 A1 | 11/2004 | Kim | | |
| 2006/0065650 A1 * | 3/2006 | Guo | ................ | B23K 26/144 219/121.84 |
| 2006/0169679 A1 * | 8/2006 | Sato | ................ | B23K 26/103 219/121.64 |
| 2006/0185473 A1 * | 8/2006 | Withers | ................ | C22C 14/00 75/10.13 |
| 2007/0017912 A1 * | 1/2007 | Flood | ................ | B23K 9/0282 219/125.11 |
| 2009/0230095 A1 * | 9/2009 | Liebold | ................ | B23K 9/296 219/121.5 |
| 2010/0193480 A1 * | 8/2010 | Adams | ................ | B23K 35/38 219/121.15 |
| 2010/0276396 A1 | 11/2010 | Cooper | | |
| 2011/0198332 A1 * | 8/2011 | Cenko | ................ | B23K 9/285 219/136 |
| 2012/0152927 A1 * | 6/2012 | Hung | ................ | B23K 9/285 219/137.62 |
| 2012/0193335 A1 * | 8/2012 | Guldberg | ................ | B23K 9/173 219/137 R |
| 2013/0011569 A1 * | 1/2013 | Schein | ................ | C23C 4/131 427/446 |
| 2015/0048553 A1 * | 2/2015 | Dietrich | ................ | B29C 64/268 264/401 |
| 2015/0108094 A1 | 4/2015 | Siewert | | |
| 2016/0067811 A1 * | 3/2016 | Jiang | ................ | B23K 9/073 219/75 |
| 2016/0288264 A1 * | 10/2016 | Jones | ................ | B23K 26/342 |
| 2017/0120398 A1 * | 5/2017 | Veldsman | ................ | B23K 9/32 |
| 2017/0304896 A1 * | 10/2017 | Kovalchuk | ............ | B33Y 10/00 |
| 2018/0065180 A1 * | 3/2018 | Machida | ................ | B22F 3/105 |

* cited by examiner

MACHINING MODULE FOR A DEVICE FOR AN ADDITIVE MANUFACTURING PROCESS

CROSS REFERENCE TO RELATED APPLICATIONS

This application is the U.S. national stage of International Application No. PCT/DE2016/100461, filed on 2016 Oct. 4. The international application claims the priority of DE 102015117238.0 filed on 2015 Oct. 9; all applications are incorporated by reference herein in their entirety.

BACKGROUND

The invention relates to a machining module to be used in a device for producing complex metallic parts, e.g. made from a mixture of metallic materials, by means of an additive generative manufacturing process, wherein a sheet, wire, or pulverulent metal-containing material is melted and applied in layers.

Additive-generative manufacturing processes already occupy an important position within manufacturing technologies today. However, the limiting factor in process speed is often the combined system of protective gas coverage and cooling. Since the starting material is usually melted during generative manufacturing processes, very high process temperatures can occur. This happens particularly when using metallic materials, which exhibit melting temperatures of up to 2000° C. and more. As a result, on the one hand a considerable heating of the entire system causes a change in the structural properties of the deposited metal layers and, on the other hand, there is an increased tendency of the metal to oxidize, which in turn can influence the properties of the manufactured component, especially in its edge zones.

Therefore, it was proposed to cool the component during generative manufacturing, e.g. by submersion into a cooling liquid as described in US 2015/0108095 A1. This solution for cooling, however, has the disadvantage of a very high technical effort, whereby the entire component is enclosed in liquid at the end of the process. Furthermore, the fluid is cooling the component from its outer walls, in that the transport of heat needs to be carried out over large distances in case of massive components, thus reducing the cooling rate. In addition, cooling with a liquid has the disadvantage that the component is wet after completion and must be dried. Additionally, in particular in case of additively manufactured bodies it may occur that closed cavities are formed in which remainders of the cooling liquid remain.

Also the spraying of liquids known from other processes (e.g. during mechanical machining) in order to achieve fast cooling exhibits said disadvantages.

Furthermore it is proposed to manufacture using a cooled (lost or reusable) printing platform. In this case, the disadvantages of the limited heat dissipation due to cooling of the component by its wall or contact surface being in thermal contact with the printing platform are only more pronounced.

From the state of the art it is also known to cool using a strong gas flow. DE 10 2013 022 056 A1 discloses a device for welding using an electric arc, wherein a flow of cold gas is created around the electric arc by use of e.g. a ring nozzle, said flow of cold gas additionally constricting the electric arc. The disadvantage of this solution is that for a sufficient cooling effect the gas flow has to be so strong that during its application it disturbs the protective gas effect or even the arc itself.

US 2015/041025 A1 shows a device for additive manufacturing, in which a cooling gas nozzle is positioned in feed direction behind the processing beam which creates a weld pool on the surface of the workpiece. Therefore, forced cooling of a punctual area in feed direction behind the processing beam is made possible by means of applying cooling gas to the still hot surface using the cooling gas nozzle. In fact, any disturbance of the e.g. electric arc by the cooling gas is avoided by spatially separating the position of forced cooling from the position of generating the weld pool. However, due to said separation this device allows only for restricted cooling possibilities.

As already stated, it is of further importance to perform generative manufacturing using a protective gas atmosphere, particularly when using metal materials, which show enhanced oxidation due to the elevated process temperatures. It is generally known that the construction space in which the component is manufactured must be flushed with inert gas, as described e.g. in DE 196 49 865 C1 or CN 104 353 832 A. For this purpose, however, a considerable technical effort is required to seal the construction space, as becoming evident particularly by example of WO 2012/134299 A2.

SUMMARY

The object of the invention is to provide a machining module for a device for additive layer manufacturing a molded metal body by using molten sheet, wire, or pulverulent starting material, by means of which during deposition of the layers shall be achieved both, a selective precise cooling in an arbitrarily definable range of the melting bath as well as completely covering of the surface by protective gas, wherein the technical effort for sealing the construction space hermetically against the ambient environment becomes obsolete.

The solution of this object is achieved with a machining module according to claim 1; useful embodiments of the invention are found in the dependent claims.

DETAILED DESCRIPTION

By the term "machining module" as used herein is understood that component of a device for additive generative manufacturing, which at least comprises a material supply device, e.g. a wire supply module, wherein the sheet, wire, or pulverulent starting material provided by the material supply device in order to build up layers may be melted e.g. by use of a laser beam or an electric arc. The heat source for providing the energy to melt the material may be part of the machining module; alternatively, the heat source may be positioned separately, e.g. outside of an encapsulated construction space for manufacturing.

The machining module according to the invention therefore is designed as a component of the device for producing a molded metal body from at least one fusible sheet, wire, or pulverulent metal-containing starting material, which is fused by means of a heat source (e.g. by means of an electric arc or a laser beam) and deposited in a molten phase at a position on top of the already formed part of the molded body to be manufactured, wherein the molten material solidifies by means of targeted cooling after deposition, thus forming a solid metal.

The position, i. e. a spatially confined area, on the surface of the already formed part of the molded body where the molten material is deposited onto the surface in the following will be referred to as "site of generation action".

According to the invention the machining module comprises besides the material supply device a protective gas supply device, which has an outlet opening arranged annularly about the material supply device, and a fluid supply device for supplying at least one fluid to a position located on or immediately adjacent to a melt bath formed on the surface of the molded body just being manufactured.

As used herein, the term "protective gas" generally denotes a gas, which is adapted to prevent the oxidation of molten metal, for example a noble gas such as argon, a process gas such as carbon dioxide or an inert gas such as nitrogen.

The protective gas supply device may exhibit one annularly shaped outlet opening or a plurality of outlet openings arranged along a circle encircling the material supply device. Due to this annular arrangement about the material supply device it is possible to place a local protective gas covering, i.e. a basically cylindrical volume filled with protective gas (shielding gas), around the supplied material as well as the site of generation action by means of the protective gas supply device.

The fluid supply device preferably comprises a plurality of nozzles (i.e. outlet openings to release the fluid) which are arranged in the vicinity to the material supply device of the machining module in a way, that either the fluid can flow against the molded body at a predetermined position at a spot or a locally confined area on the surface immediately adjacent to the melt bath or that the melt bath can be enclosed completely by the fluid.

Here, the part of the surface of the molded body which is exposed to the fluid can have an arbitrary orientation in relation to the horizontal. For example, the part of the surface at which the fluid is impinging may be oriented horizontally (i.e. the fluid hits the molded body at a position adjacent to the melt bath). The surface area of the molded body exposed to the fluid can also be oriented along the plumb line (i.e. the fluid impinges on a side wall of the molded body in an area beneath the melt bath).

According to the invention the position of punctual or partial incident flow can be varied freely during manufacture, i.e. a beam impinging e.g. at a point on the surface of the molded body is controllable by means of the fluid supply device in a way, that the point of incidence may rotate around, i.e. run about, the melt bath formed on the surface.

It further may be provided that the fluid hits the molded body in a (extended) region on the surface thereof, wherein the region may exhibit the shape of e.g. a closed circle or a circular arc section. In particular, the position of the circular arc section and/or its extension, i. e. its central angle, may vary during manufacture.

The fluid may be a cooling agent, a process gas and/or a protective gas.

The control of the fluid supply device, i.e. the specific definition of the surface area to be treated with the fluid as well as the fluid mass flow of the fluid flowing out of the nozzles, is done path-dependent, i.e. the fluid mass flow as well as shape and position of the surface area to be treated during manufacture are determined based on the programmed path of the site of generation action on the layers to be manufactured, wherein the geometry description data of the molded body can also be regarded, in order to e.g. position and/or scale the fluid mass flow with respect to a wall thickness or structural dimension of the molded body.

In order to achieve an accelerated and controlled, respectively, cooling of the molten material deposited into the layers by means of the invention it is made possible to locally cool the surface at a position which is trailing the site of generation action (while at the same time the site of generation action is enclosed by protective gas). Likewise, a specific temperature treatment, e.g. cooling, of a region on the surface of the molded body directly ahead (with respect to the direction of travel) of the site of generation action is possible.

The structure formation, i.e. the formation of a microstructure within a metallic material (i.e. a metal, an alloy or another metal material mixture) formed from a metal-containing melt, takes place during solidification. Due to an active and targeted cooling, e.g. by furnishing a process gas using the fluid supply device, being performed by use of the machining module according to the invention, the structure formation can be controlled by e.g. controlling the solidification behaviour of starting materials already mixed in the melt by controlling the temperature during cooling and solidification of the melt (e. g. by forming an alloy).

Controlling of the temperature during an additive manufacturing process, for example the cooling rate, may be variable in the course of the process by using the machining module according to the invention, i.e. the microstructure formation can be adjusted within wide limits applying a temperature control aided by precise supply of coolant.

By means of the invention, therefore, it is possible to fabricate parts from tailored metal structures by repeatedly depositing fused material of merely drop-size and targeted solidifying these droplets, wherein any oxidation of the metallic melt is reliably prohibited by means of the protective gas supply device.

The protective gas supply device is advantageous, since a locally confined "gas shielding" may be placed around the fused material. Thus, for the generative manufacturing device the technical efforts for a construction space to be sealed against the environment is eliminated, since the layer-by-layer production can be performed under locally established protective gas atmosphere.

The invention is applicable to well-known additive methods (like e.g. laser sintering, laser melting, shape giving welding, ultrasonic welding etc.), by means of which individual layers with different thicknesses ranging from a few micrometers to several millimeters can be produced by deposition of fused materials.

Advantages of the invention also include the fact that a desired microstructure can be produced locally. In this way, previously existing production restrictions in the production process of the part can be circumvented. Due to the layer-by-layer production in terms of generative manufacturing, a specific material system with locally defined and locally variable properties can be created. In this way, the specific material properties can be changed within a solid component (due to the locally variable microstructure).

By directly creating the desired material structure only when "printing" the component, a very precise adaptation and variation of the respective material structure in the layers or local areas of the molded body is made possible, so that a solid component can be produced which is particularly strong in individual regions, e. g. due to the selected structure as appropriate.

According to an embodiment of the invention the fluid supply device comprises a nozzle which is rotatable around the material supply device in a plane parallel to the plane of the layer under construction. For this purpose, the machining module can, for example, have a rotational axis perpendicular to the layer to be built up, so that by rotating the machining module around this rotational axis, the nozzle can (in the same way) rotate around the rotational axis.

In this way, the jet of coolant flowing out of the nozzle can be directed to any position on the surface of the molded body next to the deposited molten material, wherein, for example, in the case of a wave-shaped path of the site of generation action on the surface of the molded body during the manufacturing process, the cooling can always be positioned exactly in the area "behind" the melt bath.

According to an embodiment of the invention the fluid supply device comprises a plurality of nozzles being arranged annularly about the material supply device. In this way, a ring-shaped area on the surface encircling the melt bath can be cooled.

In particular it may be provided that each of the nozzles may be opened or closed by means of an individually controllable valve. In this way, for example, it is possible to let coolant flow only from the nozzle that is, with respect to the direction of travel of the machining module, located behind the material supply device.

Additionally it may be provided that during operation of the machining module both, a coolant as well as a process or inert gas is flowing, i.e. coolant flows from one part of the plurality of nozzles and process or inert gas flows from the remaining part of the plurality of nozzles. For this purpose, each of the nozzles can be connected to an individually controllable switching valve, whereby the switching valves are each connected to a coolant supply line and a process or protective gas supply line. Thus, either coolant or process gas and protective gas, respectively, can flow from each of the nozzles.

According to another embodiment a mixer or a mixing faucet may be inserted instead of the switching valve, wherein by means of said mixer or mixing faucet an accurately defined mixture of protective gas and coolant may be provided. Moreover, for each of the nozzles an identical or a differing ratio of mixture may be selected.

The invention can be designed in such a way that a gaseous coolant, e. g. a protective gas, a coolant in solid phase, e. g. carbon dioxide pellets or powdered carbon dioxide snow, or an aerosol is used as a coolant for the targeted cooling of the deposited fused material.

The advantage of dry ice or aerosols is their additional contribution to heat dissipation due to the absorption of latent heat during sublimation or evaporation, wherein the molded body essentially remains dry.

It may be provided, too, to use a liquid, e.g. a corrosion preventing liquid or a cryogenic liquid (i.e. a gas liquefied at a temperature below −150° C.), as the coolant.

According to an embodiment of the invention the machining module comprises a temperature-sensitive camera system, by means of which the temperature of the surface of the molded body in an area around the site of generation action can be detected space-resolved, as well as an evaluation and control unit connected to the camera system and the individually controllable nozzles or a drive for rotating the processing module about a rotation axis aligned perpendicular to the layer under construction. The evaluation and control unit is set up in such a way that it controls the coolant flow, i.e. the positioning, spatial distribution and/or the mass flow, based on the temperature values being present at the surface of the molded body as detected by the camera system.

It may be provided that the machining module comprises a suction device, e.g. in the form of a suction nozzle or an annular nozzle arranged around the fluid supply device (in a radial direction outside of said fluid supply device), by means of which e.g. evaporated liquids used as coolant can be collected, in order to reuse these liquids for cooling purposes (after cleaning and/or cooling down).

This embodiment of the invention in particular allows for cooling using a strong coolant flow, since for example excess liquid coolant, which did not evaporate, can be collected by means of the suction device, in that the molded body remains dry.

The suction device can also be designed in the form of an annular nozzle arranged around the material supply device, by means of which e.g. evaporated starting materials and/or welding fumes can be removed. This has the advantage of reducing the impairment of the spatially resolved temperature measurement by means of the temperature-sensitive camera system during layer deposition.

The invention can also be designed in such a way that the machining module can be tilted or rotated about an axis parallel to the plane of the layer to be built up.

BRIEF DESCRIPTION OF THE DRAWINGS

The invention will now be described in more detail by way of example on the basis of the accompanying drawings. Shown therein are.

DETAILED DESCRIPTION OF THE PREFERRED EMBODIMENTS

Figure 1:
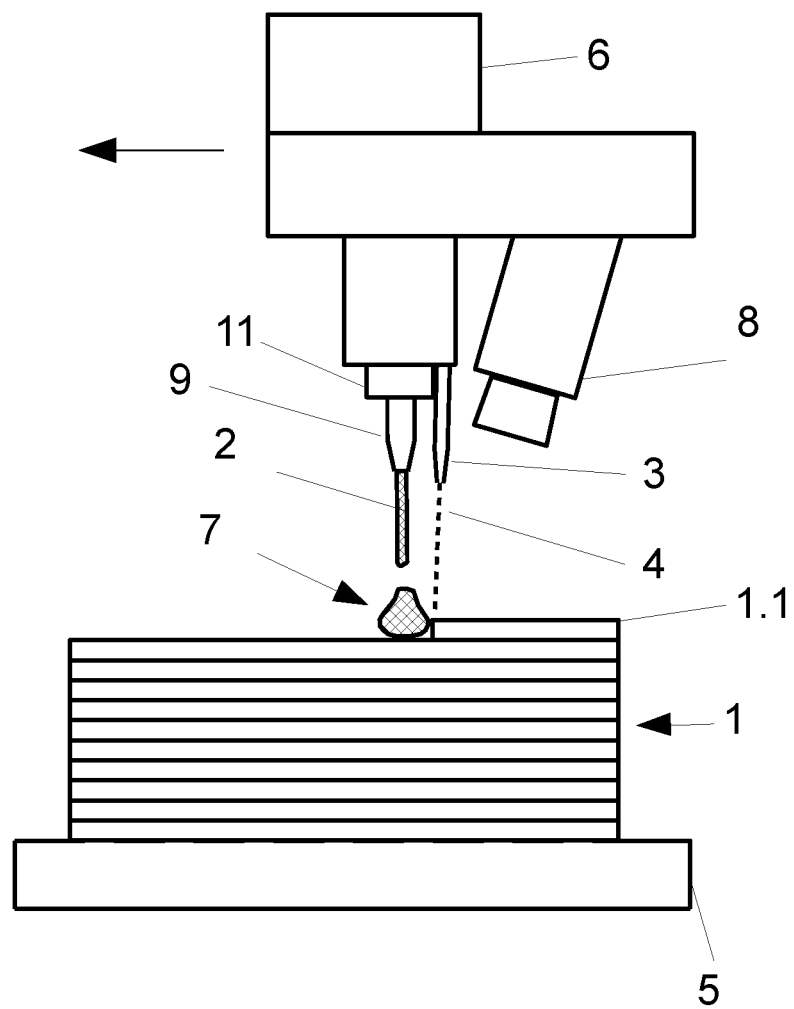
FIG. 1 a schematic representation of a machining module during additive manufacturing.

The molded body 1 is built up according to FIG. 1 layer-by-layer on top of the printing platform 5, in that individual metal droplets are melted off from the starting material 2, in this case a metal wire made of titanium, supplied by the material supply device 9 and deposited in a molten state within the layer 1.1 at the site of generation action 7.

The protective gas supply device 11 exhibiting an outlet opening arranged annularly about the material supply device 9 creates a protective gas shielding (not shown) around the site of generation action 7.

By means of the fluid supply device 3 the coolant 4 is directed precisely onto the layer 1.1 and the deposited, still molten drop of the material 2, respectively, at a location, which is located with respect to the direction of travel (illustrated by the arrow) behind the site of generation action 7. Thus, said drop of molten material 2 is solidified. In this exemplary depiction the layer thicknesses are shown exaggerated.

The temperature-sensitive camera 8 detects the temperature of the layer 1.1 in an area around the site of generation action 7. The evaluation and control unit 6 permits the control of the coolant impact position and the coolant mass flow.

Figure 2:
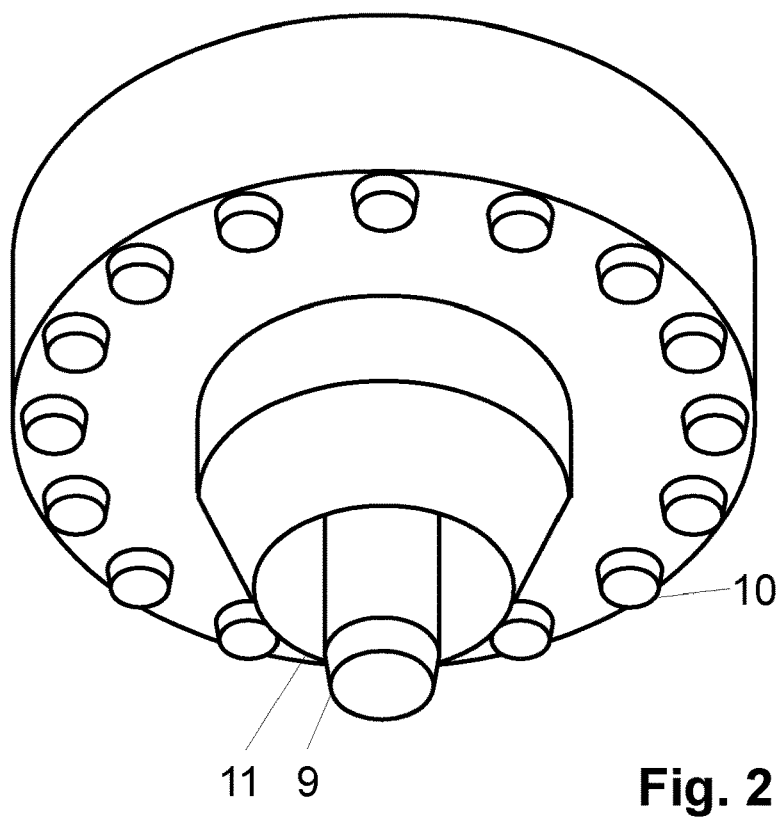
FIG. 2: a schematic representation of a first embodiment of the machining module in oblique view.

FIG. 2 shows the embodiment of the machining module comprising the nozzles 10, which are arranged along a circle around the protective gas supply device 11 and the material supply device 9.

Figure 3:
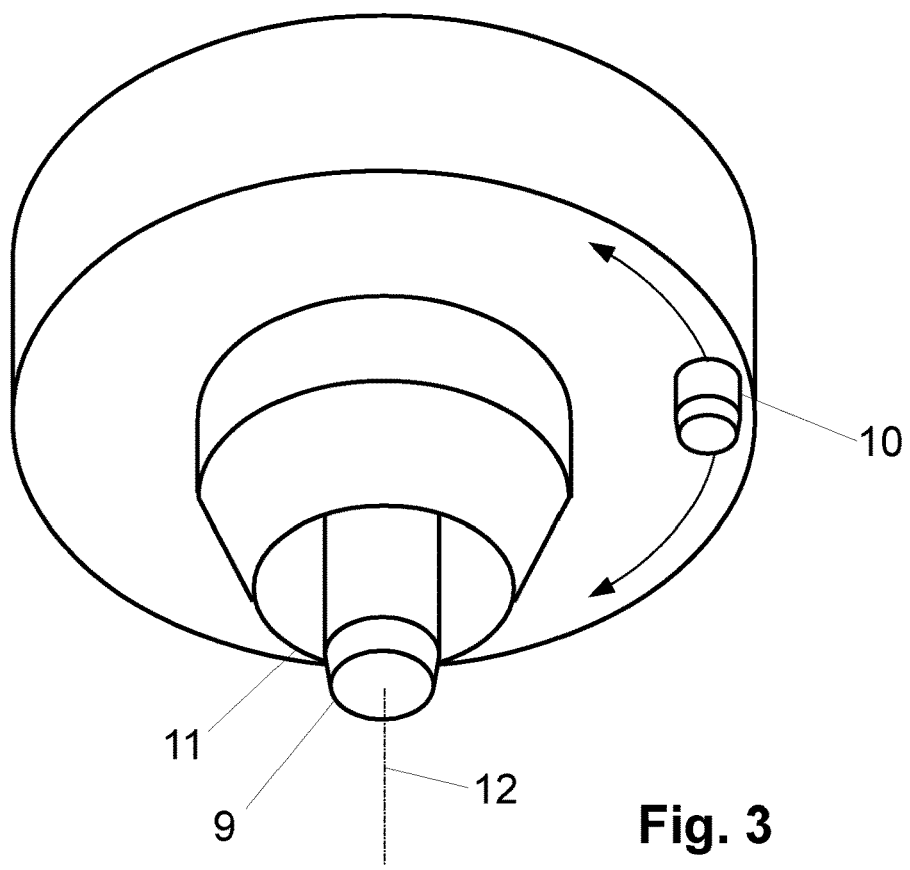
FIG. 3: a schematic representation of a second embodiment of the machining module in oblique view.

FIG. 3 displays an embodiment of the machining module with only one nozzle 10, whereby the whole machining module can be rotated about the axis of rotation 12.

Figure 4:
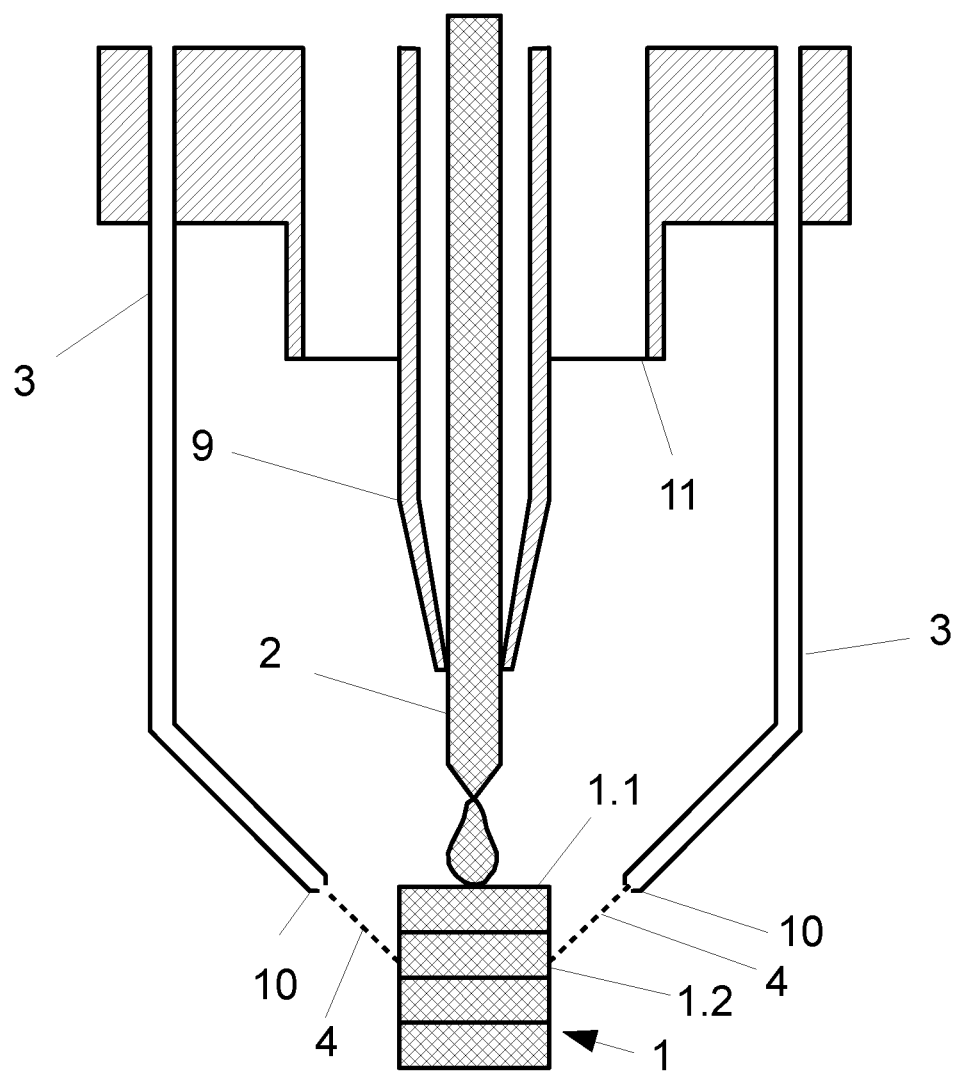
FIG. 4: a schematic representation of a third embodiment of the machining module in a cross-sectional view.

In a third embodiment of the machining module according to FIG. 4 the fluid supply device 3 is designed in such a way, that the coolant 4 by means of the nozzles 10 is sprayed onto the layers 1.2, which are located beyond the layer 1.1 under construction, in that the active cooling is not carried out from the top but from the side walls of the molded body 1.

LIST OF REFERENCE NUMERALS 1 molded body
1.1 layer
1.2 layer
2 starting material
3 fluid supply device
4 coolant
5 printing platform
6 evaluation and control unit
7 site of generation action
8 temperature-sensitive camera system
9 material supply device
10 nozzle
11 protective gas supply device
12 axis of rotation

The invention claimed is:

1. A machining module for a device for producing a molded metal body (1) by means of depositing a meltable wire as a starting material (2) within individual, successive layers (1.1) at a site of generation action (7), wherein the machining module comprises a wire supply module (9) and a protective gas supply device (11), wherein said wire supply module (9) comprises a wire supply tube, and wherein said protective gas supply device (11) having at least one outlet opening arranged annularly about the wire supply tube of the wire supply module (9),
characterized in that
the machining module further comprises a fluid supply device (3) for supplying a fluid in the form of a coolant (4),
wherein the fluid supply device (3) comprises at least one nozzle (10) being arranged spatially adjacent to the wire supply tube of the wire supply module (9) wherein a surface of the molded body (1) is supplied with the fluid in at least one point or in a partial area at a position directly adjacent to the site of generation action (7), wherein said position can be specified during manufacturing in each case by a position variable, wherein the fluid supply device (3) comprises one nozzle (10), wherein the one nozzle (10) is during manufacturing rotatable around the wire supply tube of the wire supply module (9) in a plane extending parallel to the layer (1.1) to be produced and that at least the fluid supply device (3) is rotatable around an axis of rotation (12) extending perpendicular to the individual, successive layers (1.1) to be produced, wherein the machining module further comprises a drive for rotating the machining module about the axis of rotation (12), and wherein the machining module further comprises a temperature-sensitive camera system (8), by means of which a temperature prevailing in an area around the site of generation action (7) can be detected spatially resolved, as well as an evaluation and control unit (6) being connected to the camera system (8), the fluid supply device (3) and the drive for rotating the machining module, said evaluation and control unit (6) being set up for the fluid supply device (3) to be controlled based on the temperature detected by the camera system (8).

2. The machining module of claim 1, characterized in that the machining module further comprises a suction device for fluid and/or flue gases to be removed from the surface of the molded metal body (1).

3. The machining module of claim 1, characterized in that the coolant (4) is a process gas.

4. The machining module of claim 1, characterized in that the coolant (4) is an aerosol.

5. The machining module of claim 1, characterized in that the coolant (4) is dry ice in the form of powder or pellets.

* * * * *